Patented Aug. 7, 1923.

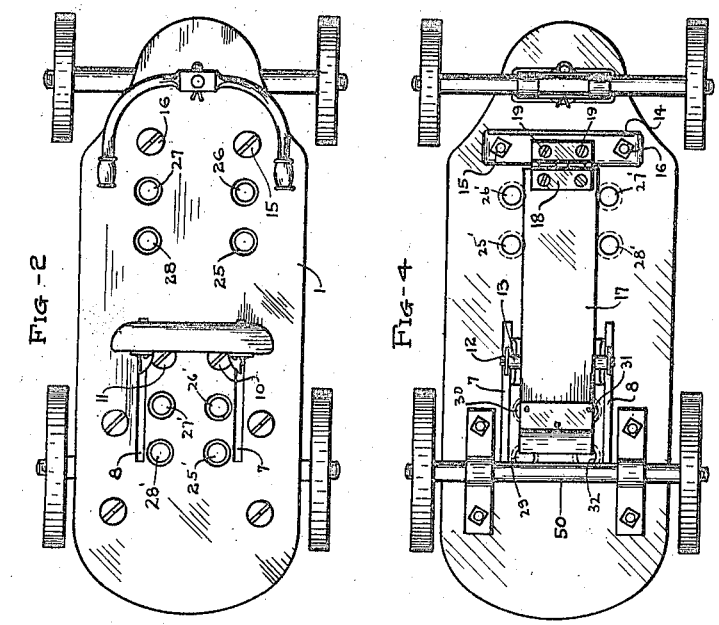

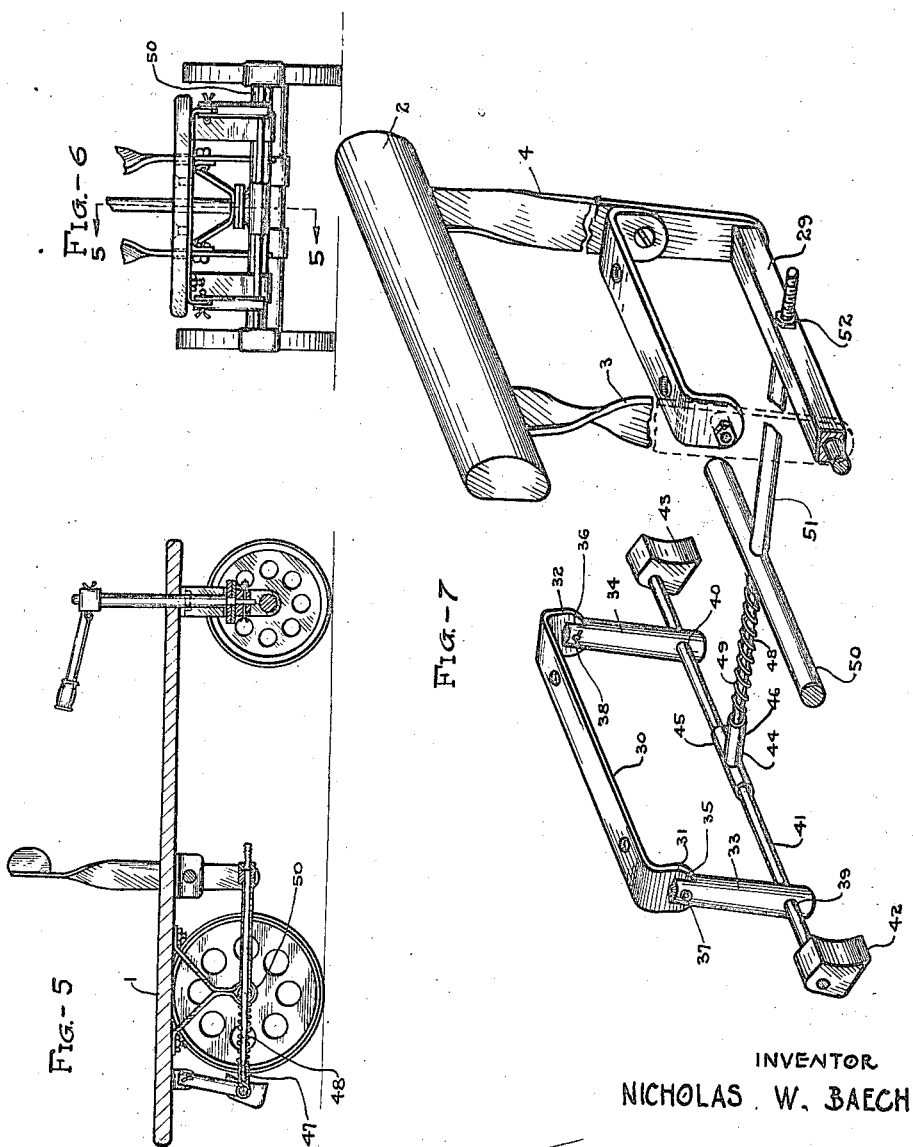

1,464,465

UNITED STATES PATENT OFFICE.

NICHOLAS W. BAECHLE, OF CINCINNATI, OHIO.

COASTER BRAKE.

Application filed March 10, 1922. Serial No. 542,792.

*To all whom it may concern:*

Be it known that I, NICHOLAS W. BAECHLE, a citizen of the United States, and a resident of Cincinnati, in the county of Hamilton and State of Ohio, have invented certain new and useful Improvements in Coaster Brakes, of which the following is a specification.

My invention relates to coaster brakes and more particularly to brakes adapted for coaster wagons and the like.

The objects of my invention are to provide a means whereby the rider can bring the coaster to a stop without removing his or her hands from the steering mechanism.

Another object of my invention is to provide a means whereby the back rest can be so adjusted in relation to the steering mechanism as to accommodate different size occupants.

Another object of my invention is to provide a means whereby the brake or brakes can be applied to the wheels by the back.

Another object of my invention is to provide a means whereby the brake arrangement is applied to the ground by a slight pressure backwards on the back rest by the rider.

Another object of my invention is to provide a means whereby the brake or brakes can be applied to the wheels or to the ground.

My invention consists in the novel combination and arrangement of parts and in the details of construction as herein set forth and claimed.

In the drawings:

Fig. 1 is a side elevation of the brake, that is applied to the ground, mounted in a coaster wagon;

Fig. 2 is a plan view thereof;

Fig. 3 is a rear elevation of Fig. 1;

Fig. 4 is a bottom view of Fig. 2;

Fig. 5 is a sectional elevation of the brake that is applied to the wheels and is taken on a plane corresponding to the line 5—5 of Fig. 6;

Fig. 6 is a rear elevation of Fig. 5 with parts broken away; and

Fig. 7 is a perspective view of the brake mechanism in which the brakes engage the wheels.

In the embodiment of my invention as illustrated and which shows a perferred construction, I provide a coaster provided with a body 1. Back rest 2 is rigidly fixed to supporting members 3 and 4 by screws 5 and 6 or other suitable means of construction. The body 1 is provided with slots 7 and 8 for the purpose of receiving supporting members 3 and 4 respectively. A U shaped bracket 9 forming a back rest mounting is substantially fixed to the under side of body 1 by bolts 10 and 11 and is centrally located between slots 7 and 8, said bracket forming a pivot means for supporting members 3 and 4.

The lower ends of supporting members 3 and 4 have a shaft 12 rigidly connected therebetween on which roller 13 oscillates.

Brake mounting 14 is bolted to under side of coaster 1 by bolts 15 and 16 and has brake 17 pivotally attached thereto by hinge 18.

Brake 17 is of wood or other suitable material and extends rearwardly and downwardly from brake mounting 14 and its lower end is faced or covered with a metal shield 20.

The upper side of brake 17 has a back rest stop 21 substantially fixed thereon which engages roller 13 thus limiting the forward movement of back rest 2. The reversed movement of back rest 2 or when rider leans against it is limited, when bearing face 22 of shield 20 comes in contact with the ground as shown by dotted lines in Fig. 1.

The disengaged position of brake 17 with the ground is maintained by spring 23 except when sufficient pressure is applied to back rest 2 to overcome said spring.

Spring 23 is attached to the lower side of coaster body 1 and the upper side of brake 17 by spring eyes 24 said eyes being embedded in the respective parts. Holes 25, 26, 27 and 28 respectively to the front of coaster 1 are for the adjustment of bolts 15 and 16. Holes 25', 26', 27' and 28' respectively to the rear part of coaster 1 are for the adjustment of bolts 10 and 11.

The normal position of this style, is shown in Fig. 1 by full lines, and the engaging or braking position is represented by dotted lines. To operate this brake the rider who is seated on body 1 merely applies pressure to back rest 2, this pressure overcoming spring 23 and permitting roller 13 to ride forward on back rest stop 21 thereby depressing brake 17 until metal shield 20 comes in contact with the ground thus stopping the coaster as desired. When the pressure is released the spring 23 automatically draws brake 17 upward and roller 13 backward, until said roller engages back rest stop 21 thus limiting forward movement of back rest 2 and holding the brake in a disengaged position.

Figs. 5, 6 and 7 illustrate a modified construction of my invention wherein a pivoted shaft 29 oscillates in the ends of support members 3 and 4. On the under side and to the rear of coaster 1 bracket 30 is rigidly attached. Bracket 30 has downwardly projecting ears 31 and 32 formed at each end thereof. Ears 31 and 32 act as a pivot support for one end of brake supporting links 33 and 34. The upper ends of said brake supporting links are provided with grooves 35 and 36 for the purpose of receiving ears 31 and 32 and are pivotally held in place by cotter pins 37 and 38. The lower ends of said brake supporting links are provided with holes 39 and 40 through which brake shoe rod 41 passes and is rigidly attached thereto. Brake shoe rod 41 has brake shoes 42 and 43 securely attached to its ends. T shaped connecting member 44 is centrally located between links 33 and 34 and the portion 45 (as indicated in Fig. 7) pivotally receives brake shoe shaft 41. The front portion 46 of T shaped connecting member 44 has internal threads 47 adapted to hold one end of shaft 48. Coil spring 49 encircles shaft 48 and is seated at one end on front portion 46 of T shaped connecting member 44. Shaft 48 passes through axle 50, or support thereon said axle forming the other seat for coil spring 49. Shaft 48 is slidably extended through axle 50 and spacing sleeve 51 thence through square shaft 29 and is held in place by adjusting nut 52.

Adjusting nut 52 is for the purpose of limiting the movement of the back rest and of taking up wear of the brake shoe.

Back rest 2 on this style brake is limited as to its forward movement by spacing sleeve 51.

While I have shown and described particular constructions as set forth it will be apparent that my invention is capable of modification without departure from its scope or spirit as defined in the claims.

What I claim as new and desire to secure by Letters Patent is:

1. In coaster brakes, a pivotally mounted back rest and a brake operated thereby, whereby movement of the back rest will operate said brake.

2. In coaster brakes, a coaster, a back rest pivotally mounted thereon and a brake pivotally connected to said coaster and slidably engaging said back rest.

3. In a coaster brake, a coaster, a back rest pivotally mounted thereon, a brake pivotally attached to said coaster and slidably engaging said back rest and a spring connected to said coaster and to said brake, whereby the latter is normally held out of braking position.

4. In a coaster brake, a coaster, a back rest pivotally mounted thereon, a pivotally mounted brake slidably engaging said back rest, a spring supporting said brake out of operative engagement and a stop to limit the forward movement of said back rest.

5. In a coaster brake, a coaster having steering means and provided with slots through its seat portion, supports for said back rest extending through said slots and pivotally mounted thereunder, a brake mounting, a brake hinged thereto and extending downwardly and backwardly therefrom, a stop on said brake, a shaft connecting said supports, a roller on said shaft adapted to oscillate in engagement with said stop and a spring adapted to hold said brake in non-braking position.

6. In a coaster brake, a coaster, a back rest pivotally mounted thereon, a brake pivotally mounted and having a bearing face thereon, a stop on said brake, and means for engaging said back rest and stop.

7. In a coaster brake, a coaster, a pivotally mounted back rest, a roller mounted on the lower end thereof, a pivotally mounted brake, a stop on said brake and a spring adapted to hold said roller and brake in engagement with each other.

8. In a coaster brake, a coaster having steering means and provided with slots through its seat portion, supports for said back rest extending through said slots and pivotally mounted thereunder, a brake mounting, a brake hinged thereto and extending downwardly and backwardly therefrom, a stop on said brake, a shaft connecting said supports and adapted to have sliding engagement with said stop, and a spring adapted to hold said brake in non-braking position.

9. In a coaster brake, a coaster having slots in its body and provided with suitable steering means, a U-shaped bracket mounted thereunder between said slots, a back rest, supports for said back rest extending through said slots and pivotally connected to said U-shaped bracket, a shaft connecting the lower ends of said support, a pivotally mounted brake having a suitable bearing surface, a stop on said brake shoe adapted to engage said shaft and limit the forward movement of said back rest and a spring connected to said body and to said brake shoe whereby said brake shoe is automatically held in engagement with said shaft and automatically returned to non-braking position when pressure is removed from said back rest.

NICHOLAS W. BAECHLE.